Figure 1:
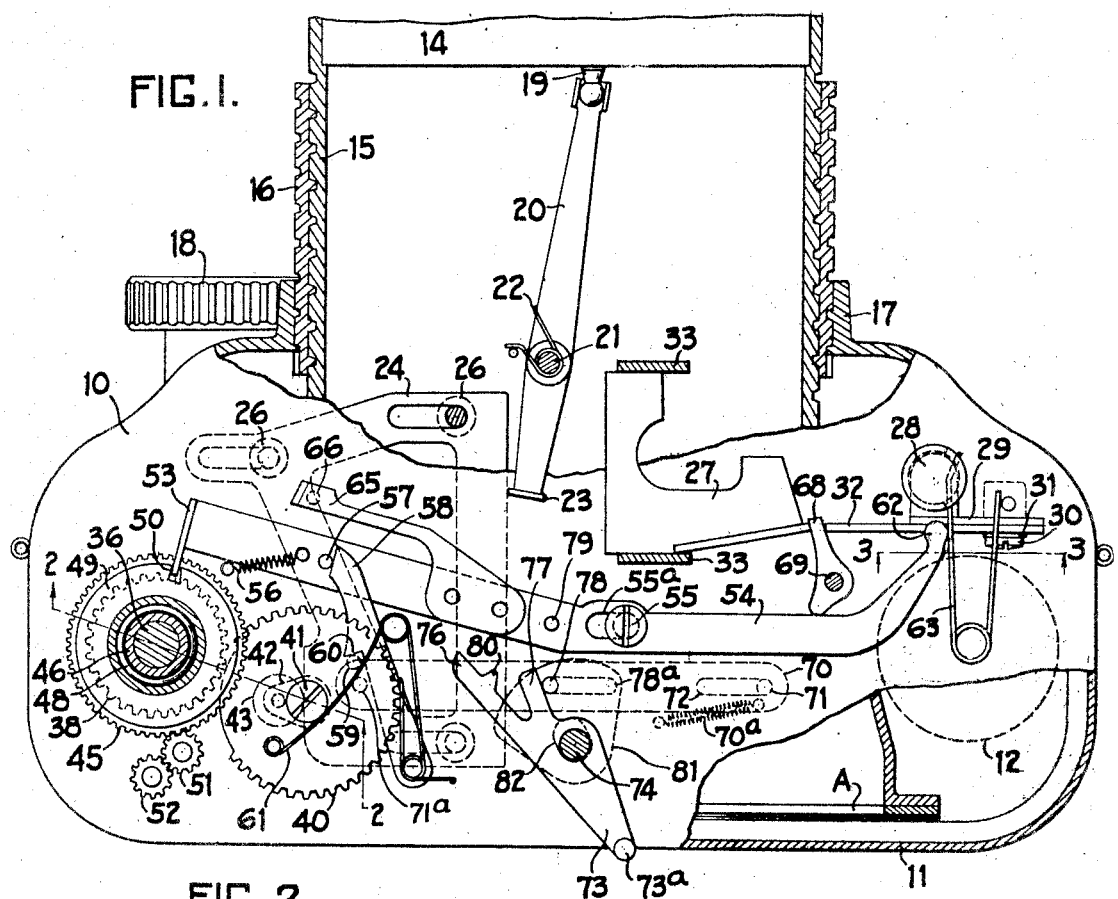

Dec. 15, 1942.   C. W. CRUMRINE   2,304,887
PHOTOGRAPHIC CAMERA
Filed Feb. 10, 1941    2 Sheets-Sheet 1

CHESTER W. CRUMRINE
*INVENTOR*

BY
*ATTORNEYS*

Dec. 15, 1942.   C. W. CRUMRINE   2,304,887
PHOTOGRAPHIC CAMERA
Filed Feb. 10, 1941    2 Sheets-Sheet 2

CHESTER W. CRUMRINE
*INVENTOR*

BY
*ATTORNEYS*

Patented Dec. 15, 1942

2,304,887

UNITED STATES PATENT OFFICE 2,304,887

PHOTOGRAPHIC CAMERA

Chester W. Crumrine, Rochester, N. Y., assignor to Eastman Kodak Company, Rochester, N. Y., a corporation of New Jersey Application February 10, 1941, Serial No. 378,235

11 Claims. (Cl. 95—31)

The present invention relates to a roll film camera having a built-in double-exposure prevention mechanism and/or built-in shutter-setting mechanism, and particularly such a camera having means for optionally and manually disconnecting said double-exposure prevention mechanism and/or manually setting the shutter.

One object of the present invention is the provision of a camera with a film winding mechanism and shutter-actuating mechanism which are so interconnected that the mechanisms can normally be operated only in proper sequence so as to thereby prevent the making of a double exposure, or the winding up of an unexposed portion of the film strip.

Another object of the invention is the provision in a camera of the type described of a double-exposure prevention mechanism which is normally positioned to prevent the inadvertent making of a double exposure, but which may be selectively movable to an inoperative position to permit a deliberate second actuation of the shutter mechanism prior to the moving of the film strip so as to enable a deliberate double exposure to be made.

A further object is the provision in a camera of the type described of a double-exposure prevention mechanism which is normally positioned to prevent the inadvertent making of a double exposure but which may be selectively movable to an inoperative position to permit a free operation of the film winding mechanism independently of the shutter-actuating mechanism so as to permit a free and unrestrained winding on, or winding off, of the film leader and trailer strips, respectively.

A still further object is the provision in a roll film camera of the type described of means for optionally and manually disconnecting said double-exposure prevention mechanism from the exterior of the camera so that the shutter actuating means can be repeatedly operated independently of an operation of the film feeding mechanism when a sheet film adapter back is detachably connected to the camera body in place of the roll film back normally used.

And yet another object is the provision in a camera of the type described having a setting type shutter which is adapted to be set by an operation of the film feeding mechanism of means for manually setting such shutter from the exterior of the camera independently of said film feeding means when a sheet film adapter back is used on the camera in place of the usual roll film back.

And still another object is the provision in a roll film camera having both a double-exposure prevention of the type set forth and a shutter adapted to be set by the operation of the film feeding mechanism of a single manually operable member accessible from the exterior of the camera for both setting the shutter independently of the film feeding mechanism and disconnecting said double-exposure prevention mechanism so that said shutter-actuating means can be repeatedly operated independently of said film feeding mechanism when a sheet film adapter is attached to the camera in place of the usual roll film back.

A further object is the provision of a camera of the type described in which the two stated functions of said single manually operable member are effected in proper sequence by a continuous movement of the member in one direction.

Figure 2:
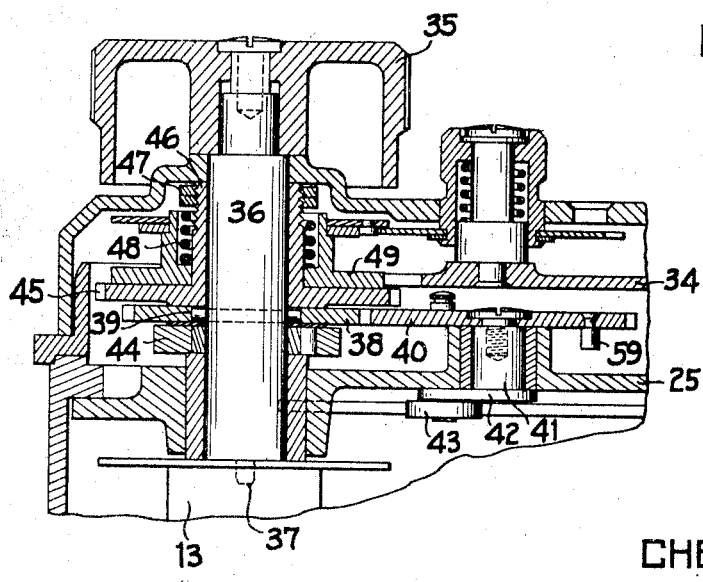
Figure 3:
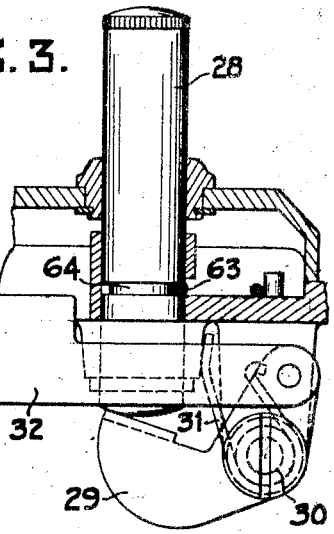
Figure 4:
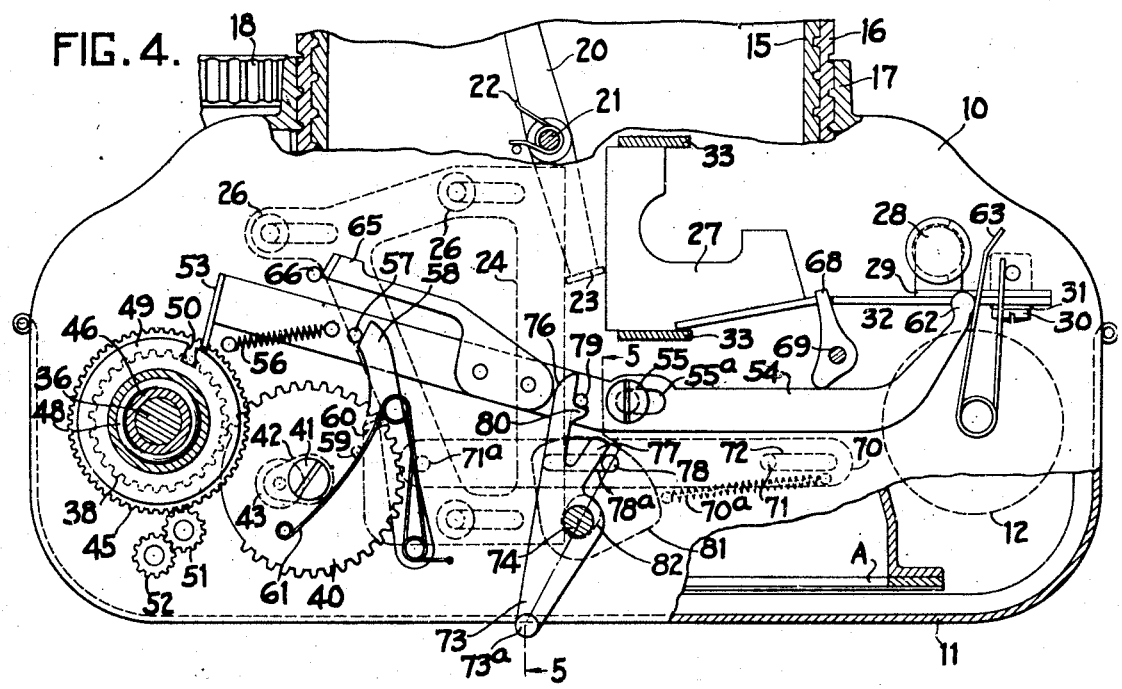
Figure 5:
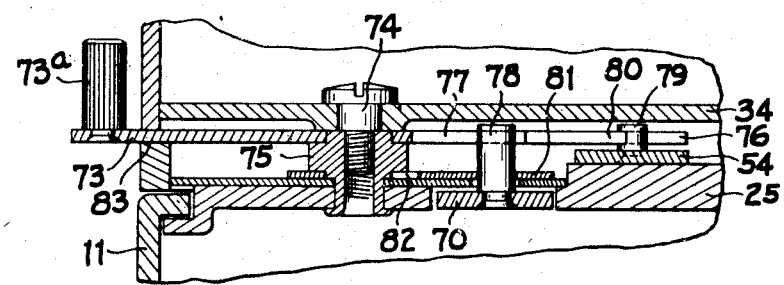
Figure 6:
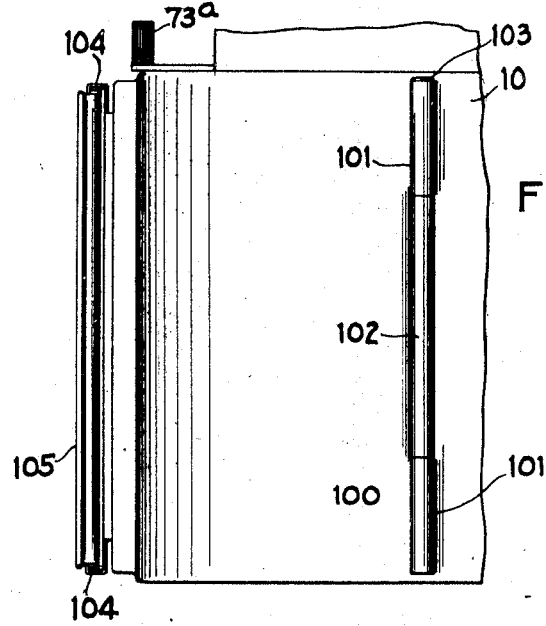

The novel features that I consider characteristic of my invention are set forth with particularity in the appended claims. The invention itself, however, both as to its organization, and its methods of operation, together with additional objects and advantages thereof, will best be understood from the following description of specific embodiments when read in connection with the accompanying drawings in which, Fig. 1 is a top plan of a camera in which an interlocking means is embodied in accordance with the present invention, parts being broken away for clarity of illustration, Fig. 2 is an enlarged sectional elevation through the winding knob, and taken substantially on line 2—2 of Fig. 1, Fig. 3 is an enlarged elevational view of the manual shutter release button, and from the positions of line 3—3 in Fig. 1, Fig. 4 is a view similar to Fig. 1, but with certain of the parts in different positions, Fig. 5 is an enlarged sectional elevation, and taken substantially on line 5—5 in Fig. 4, and Fig. 6 is a partial end elevation of the camera showing a sheet film adapter back attached to the camera body in place of the usual roll film back shown in the other figures.

Like reference characters refer to corresponding parts throughout the drawings.

The camera to which the present invention is adapted is shown in the drawings to be of similar design and construction to that illustrated in my copending applications, Serial Numbers 375,652 and 375,653, filed January 23, 1941. The camera has a body 10 to which a separable back 11 of a selected type may be detachably connected, a back of the type shown in Figs. 1 and 4 being used when roll film is in the camera; said film being drawn from the supply spool 12 across the exposure frame A and wound upon a receiving spool 13.

The film winding mechanism actuates the shutter setting and mechanical interlocking devices so that double exposures, or blank exposures, cannot be made. It may be desirable at times to provide for deliberate double exposures, for winding up the film leader strip, or winding off the film trailer strip independently of the film feeding mechanism, and this invention provides for such a condition and permits the operator to disengage the interlocking mechanism and render it inoperative by the manual movement of a single lever operable from the exterior of the camera. When a sheet, or cut, film is to be exposed in the camera by attaching an adapter back onto the camera, there is no need to operate the roll film feeding mechanism, so that the present invention is required in order to permit a manual setting of the shutter and to release the shutter actuating mechanism from the film feeding mechanism to permit it to be repeatedly operated independently of said feeding mechanism.

The normal operation of the film feeding mechanism and shutter release interlocking mechanism will be briefly described to enable the present invention to be more readily understood.

The shutter and lens assembly, only partly shown at 14, are carried in the outer end of a threaded tube 15, carried by a second tube 16 that may be turned in an internally threaded collar 17 on the camera body. The tube 15 is held against rotation but will be moved in or out for focusing by the rotation of tube 16, which may be accomplished by turning a knob 18, through gearing, not shown.

The shutter is both set and released by movement of a single member 19 which is engaged by a lever 20 pivoted at 21 in the top of tube 15. The lever 20 is urged clockwise by a spring 22 so that an upturned lug 23 on its rear end is normally pressed against one edge of the slidable frame 24 guided on the under side of the camera body top wall 25 on studs 26. Movement of frame 24 toward the right, Fig. 1, sets or cocks the shutter through lever 20, and a movement of a plate 27 toward the left releases it for making an exposure by swinging lever 20 in the opposite direction. The lever 20 is held by member 19 against the urge of spring 22 while the shutter is in a cocked condition. Movement of the plate 27 towards the left occurs when the manual release button 28 is depressed, thereby turning bellcrank 29 about its pivot 30, Fig. 3, against the action of spring 31 causing link 32 to thrust the plate 27 against the lug 23. The plate 27 is suitably guided by ears 33 on the mechanism plate 34 and it also carries other parts, later to be described.

The film winding knob 35 is mounted on a stub shaft 36 that engages spool 13 by a keyed end 37, so that spool 13 is positively rotated for winding the film. The gear 38 is keyed at 39 to the shaft 36 and is adapted to drive a second gear 40. The latter gear is fixed to a stub shaft 41 carrying the crank arm 42 and a roller 43. This roller bears against an edge of the frame 24 and moves the latter toward the right to set the shutter when the gear 40 is rotated. The shaft 36 is provided with a usual roller clutch 44 which permits clockwise rotation only.

The gear 45 is freely revoluble on shaft 36 and has an upwardly extending sleeve 46 threaded for lock nuts 47, the latter serving to adjust the pressure of a spring 48 against a clutch member 49 which has a notch 50 in its periphery. Due to the pressure exerted by spring 48, the disk 49 tends to turn with gear 45, and the latter is rotated by engagement with a pinion 51, which is in turn engaged and turned by a second pinion 52 actuated by a film engaging toothed wheel, not shown, but well known in camera construction designs.

As film is wound onto the spool 13 by the turning of knob 35 the gear 45 is turned clockwise and the disk 49 is frictionally driven thereby until notch 50 reaches a lug 53 on a main interlock lever 54 that has a pivot 55 and slot 55A that permits this lever both to rotate to a limited degree and to slide as far as the slot will permit. A spring 56 tends to return lever 54 to the left end of its movement. When an amount of film equal to one exposure frame has been wound onto the spool 13, the gear 45 will have been rotated to a point where, as in Fig. 1, lug 53 will drop into notch 50 and an extension of lug 53, not shown, will then engage gear 38 after which continued winding carries the lever 54 to the right as far as slot 55A permits thereby positively preventing further winding of the film.

During the rotation of gear 38 just described, gear 40 rotates in engagement therewith and through roller 43 carries frame 24 to its extreme right position to cock the shutter. When interlock lever 54 is moved to its extreme right position two actions occur: (1) a pin 57 thereon moves an arm 58 so that a pin 59 projecting downwardly from gear 40 may escape from a shoulder 60 on said arm permitting a hairpin spring 61 to snap the gear 40 into engagement with gear 38 again (Fig. 4); and (2) an extension 62 on the right end of lever 54 disengages a spring 63 from a groove 64 in the release member 28 so that the latter may be operated to trip the shutter. The lever 54 is held in its extreme right position by the engagement of a flat spring clip 65 over a fixed pin 66 (Fig. 4).

When release member 28 is depressed to trip the shutter, the link 32 moves to the left side and in so doing swings a small lever 68, pivoted at 69, so that the right end of lever 54 is pushed toward the rear of the camera, thus withdrawing the lower portion of lug 53 from the teeth of gear 38 and causing spring clip 65 to slip past the pin 66. The spring 56 then returns lever 54 to its original position. The gear 40 will be rotated until the last tooth thereon passes off from gear 38, at which time the spring 61 will snap the gear 40 around to bring pin 59 against the shoulder 60 where it will rest until the interlock lever 54 is again moved to the right as before described.

It is apparent from the foregoing, and from a description of a similar construction illustrated in the applicant's co-pending patent application previously mentioned, that the film cannot be wound until an exposure is made, and another exposure cannot be made until a fresh area of film has been wound past the aperture A.

However, as has been mentioned, it may be at times desirable to enable the operator to make more than one exposure on the same film area, or to wind off several remaining frames of film without exposing them. In addition, it is intended that the back 11 can be removed from the camera and be replaced by a cut, or sheet, film adapter back 100, see Fig. 6, so that films of this kind can be exposed in the camera instead of roll films if desired. For this purpose the camera backs 11 and 100 and the camera body 10 are provided with separable hinge parts which may be of any suitable construction. By way of illustration, I have chosen to show this separable hinge as comprising two spaced hollow bearing portions 101 on either end of the camera body into alignment with which an intermediate bearing portion 102 on either end of the camera back is moved when the back is properly placed on the camera, and to be so held by a removable hinge pin 103, as is well known. A cut, or sheet, film adapter back 100 will be of the same general form as back 11 with the exception that it includes a pair of guides 104 into which a well-known type of film pack 105 may be slid. It will be readily understood that when cut, or sheet, film is being used in the camera there is no need to operate the roll film feeding mechanism at any time. It is, therefore, necessary that it be possible for the operator to set the shutter and unlock the shutter actuating mechanism without having to operate the roll film feeding means, in addition to enabling him to deliberately make more than one exposure on the same film area, or to wind up the film leader strip or wind off portions of film without exposing it and without restraint of any kind to such action. It is the object of this invention, therefore, to provide mechanisms in a camera such as has been described that will permit the operator to do any one of these enumerated things separately or collectively.

Referring again to Fig. 4, the frame 24 has attached thereto a link 70 guided at its right end by a fixed pin 71 that engages a slot 72 in the link, and pinned at the other end to slide 24 by pin 71a. Obviously, as link 70 is moved, the frame 24 will also move with it, either toward the right or the left. So that the frame 24 can be moved to cock the shutter independently of the gears 38 and 40, a lever 73 is pivoted at 74 on the hub 75 between the top wall 25 and mechanism plate 35 (Fig. 5) and has an upstanding thumb release or button 73a extending to the outside of the rear of the camera body so that the lever 73 may be moved manually.

The inner end of lever 73 is bifurcated, one portion 76 being longer than the other 77. The latter is of such length that it will engage and move a pin 78 that is fixed to link 70, thereby causing the latter, and the frame 24, to be moved to set the shutter when lever 73 is swung to the left. However, even though the shutter is set as just described, it cannot be released if the spring 63 is in the groove 64 of the release member 28. Therefore, the interlock lever 54 must also be moved to its extreme right hand position. A pin 79 is fixed in lever 54 in such a position that it will be engaged by arm 76 when lever 73 is swung manually, and lever 54 will be carried to the position shown in Fig. 4, thus forcing the spring 63 out of slot 64 so that member 28 can be depressed to trip the shutter. To insure that lug 53 is well clear of gear 38 and notch 50 before it is attempted to slide lever 54, a cam faced lug 80 is provided on lever arm 76 so that a cam action occurs as this lug moves back of pin 79 and the lever 54 is pivoted to move the lug 53 out of slot 50 before the arm 76 engages pin 79 to actually start to slide the lever 54 to the right.

To prevent light from leaking into the camera when lever 73 is moved, a cover blind 81 is arranged to move with link 70 so as to cover the slot 78a in all positions of the lever 73. The pin 78 fits light tight in the plate 81, and so as to compensate for the difference in movement between the plate 81 which is arcuate, and the movement of link 70 which is linear, a slot 82 is provided about the hub 75 in the plate 81. This lever 73 is not provided with a spring to return it to the position in Fig. 1, but as the pin 78 fixed to the link 70 is constantly urged toward the left by spring 22 and another spring 70a attached to the link 70, the lever 73 will remain in the position in Fig. 4 only while being held so manually. A slot 83 in the camera body definitely limits the movement of the lever 73 in both directions.

From the foregoing description it will be readily understood that the shutter setting mechanism, and the shutter actuating mechanism, of the camera normally interconnected with the film feeding mechanism to depend for their operation upon the proper arcuation of the film feeding mechanism can be readily and manually disconnected from the feeding mechanism at any time by the simple operation of one lever accessible from the outside of the camera body. The purpose of such a manual release has been clearly set forth above and will be readily appreciated by those skilled in the art. While I have shown a camera having both the shutter setting mechanism and double-exposure prevention mechanism controlled by a film feeding mechanism, it is conceivable that a camera might have only one or the other of these mechanisms associated with the film feeding means. For instance, the camera might not have the shutter set by operation of the film feeding mechanism while including the double-exposure prevention means shown, or it might have the shutter set by the film feeding mechanism but not have the particular form of double-exposure prevention means shown. Therefore, the invention is not limited to use in a camera wherein it is required to serve the two functions set forth, but might be used in a camera requiring only one or the other of the two functions. The particular arrangement of parts which makes the dual function of the invention possible does, however, provide for a simple mechanism for doing two operations in the proper sequence in a new and novel manner.

Although I have shown and described certain specific embodiments of my invention, I am fully aware that many modifications thereof are possible. My invention, therefore, is not to be limited to the precise details of the constructions shown and described, but is intended to cover all modifications coming within the scope of the appended claims.

Having thus described my invention, what I claim as new and desire to secure by Letters Patent of the United States is:

1. In a roll film camera, the combination with a camera body, of a film feeding mechanism, a setting type shutter, actuating means for said shutter, a latch mechanism normally locking said shutter actuating means against operation, means wholly within said camera body adapted to be actuated by said film feeding mechanism for setting said shutter and releasing said latch mechanism from engagement with said actuating means, and means operable manually from the exterior of the camera body for operating said last mentioned means independently of the film feeding mechanism to set the shutter and unlatch said shutter actuating means in proper sequence.

2. In a roll film camera, the combination with a camera body, of a film feeding mechanism, a setting type shutter, a lever wholly within said camera body for setting said shutter, a shutter actuating means, interlock mechanism within said camera body for locking said shutter release after it has been operated until the film feeding mechanism is operated and for setting the shutter when said film is advanced, said interlock mechanism including a slide adapted to engage the shutter setting lever, an interlock lever actuated by operation of said film feeding means to release said shutter actuating means, and manually operable means accessible from the exterior of said camera body for moving said slide and said interlock lever independently of said film feeding mechanism to set said shutter and release said shutter actuating means.

3. In a roll film camera, the combination with a camera body, of a film feeding mechanism, a setting type shutter, a lever wholly within said camera body for setting said shutter, a shutter actuating means, interlock mechanism within said camera body for locking said shutter release after it has been operated until the film feeding mechanism is operated and for setting the shutter when said film is advanced, said interlock mechanism including a slide adapted to engage the shutter setting lever, an interlock lever actuated by operation of said film feeding means to release said shutter actuating means, and a single manually operable member accessible from the exterior of the camera body for moving said slide and said interlock lever independently of said film feeding mechanism to set said shutter and release said shutter actuating means.

4. In a roll film camera, the combination with a camera body, of a film feeding mechanism, a setting type shutter, a lever wholly within said camera body for setting said shutter, a shutter actuating means, interlock mechanism within said camera body for locking said shutter actuating means after it has been operated until the film feeding mechanism is operated and for setting the shutter when said film is advanced, said interlock mechanism including a slide adapted to engage the shutter setting lever, an interlock lever actuated by operation of said film feeding means to release said shutter actuating means, and a single manually operable member accessible from the exterior of the camera body for moving said slide and said interlock lever independently of said film feeding mechanism by a continuous motion in one direction of said member to set said shutter and release said shutter actuating means.

5. In a roll film camera, the combination with a camera body, of a film feeding mechanism, a setting type shutter, a lever for setting said shutter, a shutter actuating means, interlock mechanism in said camera body for locking said shutter release after it has been operated until the film feeding mechanism is operated and for setting the shutter when said film is advanced, said interlock mechanism including a slide adapted to engage the shutter setting lever, an interlock lever actuated by operation of said film feeding means to release said shutter actuating means, a crank pivoted in said camera body and including separate arms on one end adapted to engage and move said slide and interlock lever independently of said film feeding mechanism when pivoted in one direction, the other end of said arm extending to the exterior of said camera body to be accessible for manual operation.

6. In a roll film camera, the combination with a camera body, of a film feeding mechanism, a setting type shutter, a lever for setting said shutter, a shutter actuating means, interlock mechanism in said camera body for locking said shutter release after it has been operated until the film feeding mechanism is operated and for setting the shutter when said film is advanced, said interlock mechanism including a slide adapted to engage the shutter setting lever, an interlock lever actuated by operation of said film feeding means to release said shutter actuating means, a crank pivoted in said camera body and including separate arms on one end adapted to engage and move said slide and interlock lever independently of said film feeding mechanism when pivoted in one direction, the other end of said arm extending to the exterior of said camera body to be accessible for manual operation, and means normally moving said crank to a position wherein the separate arms thereof are out of engagement with said slide and interlock lever.

7. In a roll film camera the combination with a camera body, of a film feeding mechanism, a shutter and actuating means therefor, a latch mechanism normally locking said shutter actuating means against operation, means actuated by said film feeding mechanism for releasing said latch mechanism when said feeding mechanism is operated, and including a lever capable of both a sliding and pivotal movement and adapted to be positively connected to said film feeding mechanism to be slid by operation thereof to release said latch mechanism, and manually operated means accessible from the exterior of the camera body for pivoting said lever to disconnect it from said film feeding means and for subsequently sliding said lever to release said latch mechanism from locking engagement with said shutter actuating means, said last mentioned means comprising a bell crank one end of which is adapted to engage a pin on said lever to slide the lever, and a cam portion on said lever adapted to engage said pin and pivot said lever prior to the lever being slid.

8. In a roll film camera, the combination with a camera body, of a film feeding mechanism, a setting type shutter, means wholly within said camera body adapted to be actuated by said film feeding mechanism for setting said shutter, said means including a slide mounted within said camera body adapted to be moved to a shutter setting position and normally held in an inoperative position, and means manually operable from the exterior of the camera body for sliding said slide to its shutter setting position independently of the film feeding mechanism, and means for normally holding said last mentioned means in a position where it is entirely disconnected from said slide.

9. In a roll film camera, the combination with a camera body, of a film feeding mechanism, a setting type shutter, means wholly within said camera body adapted to be actuated by said film feeding mechanism for setting said shutter, said means including a slide mounted within said camera body adapted to be moved to a shutter setting position and normally held in an inoperative position, and an operating member pivoted in said camera for engaging and moving said slide to a shutter setting position independently of said film feeding mechanism, and including a handle accessible from the outside of said camera body, and means normally moving said operating member to a position in which it is free of said slide.

10. In a roll film camera, the combination with a camera body, of a film feeding mechanism, a shutter and actuating mechanism therefor, an interlock means in said camera body and normally adapted to alternately lock said mechanisms so that one of said mechanisms cannot be operated a second time prior to the operation of the other of said mechanisms to prevent the inadvertent making of a double exposure, said interlock mechanism including a latch normally locking said shutter actuating means, and an interlock lever mounted in said camera body for pivotal and slidable movements and normally pivoted into locking engagement with said film feeding mechanism, and normally slid in a direction to disengage said latch and permit the same to lock said shutter actuating mechanism, and a manually operable member accessible from the exterior of said camera body for first pivoting said lever to remove it from locking engagement with said feeding mechanism and subsequently sliding said lever in a direction to engage and move said latch from its normal position with respect to said shutter mechanism.

11. In a roll film camera, the combination with a camera body, of a film feeding mechanism, a shutter and actuating mechanism therefor, an interlock means in said camera body and normally adapted to alternately lock said mechanisms so that one of said mechanisms cannot be operated a second time prior to the operation of the other of said mechanisms to prevent the inadvertent making of a double exposure, said interlock mechanism including a latch normally moved into locking engagement with said shutter actuating mechanism, an interlock lever adapted to control the operation of said latch mounted within said camera body for pivotal and slidable movements and normally slid in a direction to disengage said latch and normally pivoted into locking engagement with said film feeding mechanism, and a bell crank pivotally mounted within said camera body and accessible for manual operation from said body, one arm of said bell crank including a cam portion for engaging a pin on said lever to pivot the lever from locking engagement with said feeding mechanism, and a projection adapted to engage said pin and slide said lever subsequent to said pivotal movement to engage and release said latch to free said shutter actuating mechanism.

CHESTER W. CRUMRINE.